April 24, 1928.
W. S. IRELAND
1,667,117
BELT TIGHTENING IDLER MOUNT
Filed July 15, 1926
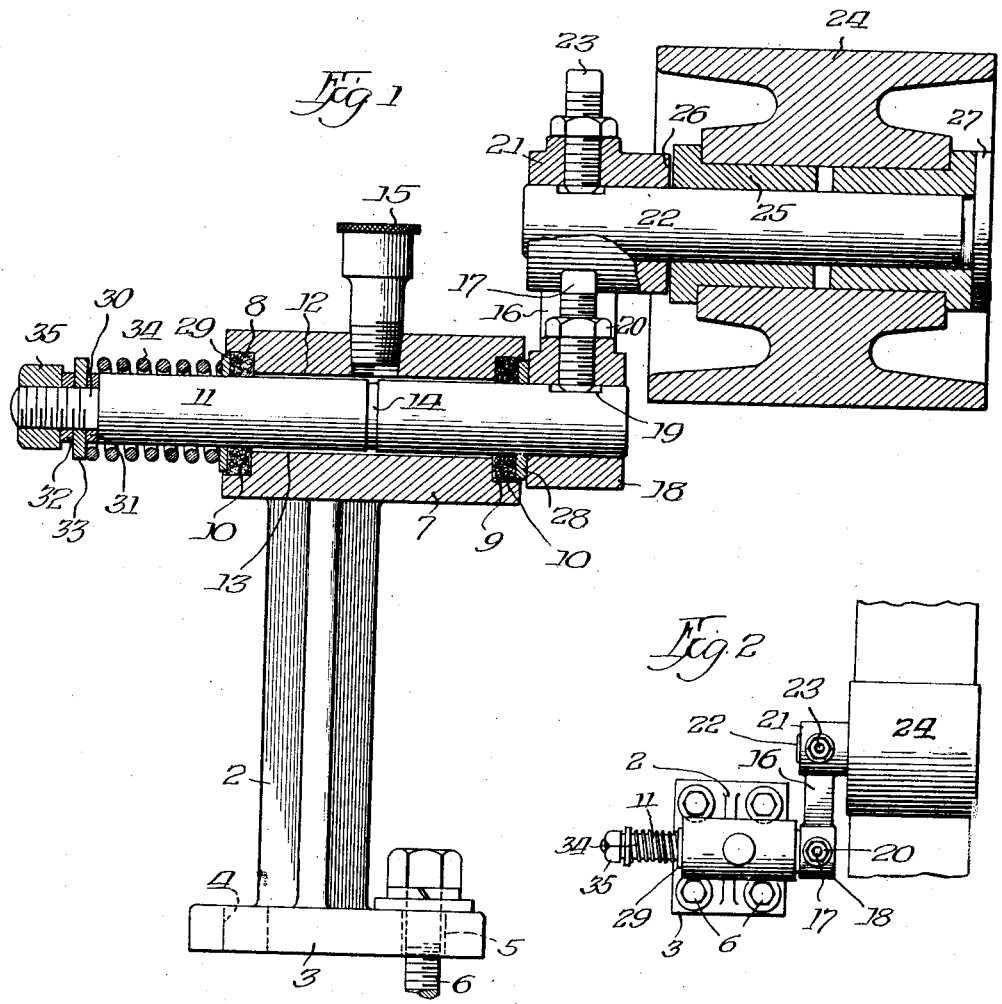
Witness
Inventor
Ward S. Ireland Patented Apr. 24, 1928.

1,667,117

UNITED STATES PATENT OFFICE.

WARD S. IRELAND, OF BELOIT, WISCONSIN, ASSIGNOR TO NATIONAL REFRIGERATION CORPORATION, OF BELOIT, WISCONSIN, A CORPORATION OF DELAWARE.

BELT-TIGHTENING-IDLER MOUNT.

Application filed July 15, 1926. Serial No. 122,573.

The invention hereinafter disclosed relates to belt pulley assemblies and more particularly to an idler pulley mount or arm adapted to serve as a belt or chain tightener.

Heretofore, great difficulty has been experienced in preventing belts, whether of leather or other material, from slapping or driving an idler pulley mounted on a pivoted arm, about its pivot thereby producing a vibration of ofttimes damaging frequency and an annoying and undesirable noise. These effects obtain regardless of whether the belt be a laced belt or a continuous one and are particularly undesirable in delicate refrigerating machinery of the smaller sizes. I have discovered, however, that the effects above noted may be entirely removed or obviated by simple expedients and it is accordingly:—

The primary object of the invention to provide simple, economical and efficient means in connection with an idler pulley or sprocket for reducing or nullifying the slapping or oscillating effect of the belt or chain against which the pulley or sprocket presses.

Further objects of the invention will be or should become easily appreciated after perusal of the following description and claims and after viewing the drawing in which:—

Fig. 1 is a sectional view in side elevation of one form of pulley mount embodying my invention and Fig. 2 is a top plan view of the same on a very much reduced scale showing the general plan or arrangement.

Referring to the drawing, 2 designates a bracket or stand having a foot 3 suitably drilled at 4 and 5 to receive bolts or lag screws 6 for securing the bracket in position on the bed frame or other part of a machine adjacent a belt. The bracket 2 is formed with a bearing 7 at its upper end which may or may not be provided with a bushing (in this instance no bushing is shown) which is recessed preferably at both ends as shown at 8 and 9 for the reception of ring packing 10 adapted to fit snugly about a shaft 11 disposed therethrough. The bearing is preferably provided with oil grooves 12 and 13, and the shaft with an oil groove 14, for the reception of oil from an oil cup 15, and the packing ring 10 serves to prevent oil from dripping from the ends of the bearing and another purpose to be hereinafter described.

The shaft 11 extends beyond the limits of the bearing at both ends, and upon one end of the shaft an arm 16 is secured by means of a set-screw 17 which passes through a hub 18 thereof into a groove 19 formed in the shaft and is locked in place by a lock nut 20. The arm 16 is provided with a second hub 21 at its opposite end into which a second shaft 22 is secured by a set-screw 23, in a manner similar to which shaft 11 is secured in the hub 18.

The pulley 24, preferably equipped with a wood bushing 25, is rotatably mounted on the shaft or spindle 22, and retained thereon between a shoulder 26 formed on the hub 21 and a flange 27 preferably formed integrally with the outer end of the spindle or shaft 22.

The pulley of the type of idler illustrated is adapted to run on part of the belt and rest thereon under the influence of gravity alone, as will be noted. It will also be evident that whenever the lacing of the belt hits the pulley or whenever the load on the belt increases, as occurs in many kinds of machinery with practically regular frequency, the pulley will be swung upwardly about the shaft 11 as a pivot. As the pulley returns by gravity, this produces vibration and an objectionable noise.

I overcome this by providing friction means adapted to resist rotational movements of the shaft 11. Between the hub 18 and the felt or other packing ring 10, and partially within the recess 9, I place a friction washer 28, preferably of bakelite micarta, and a second washer 29 of the same character partially within the recess 8, around the opposite end of the shaft. The shaft 11 at the end opposite the end connected to the hub 18 is reduced as shown at 30 to receive washers 31 and 32, between which an abutment washer 33 is secured. Between the washer or abutment member 33 and the friction washer 29 a spring 34 is interposed and the reduced end 30 of the shaft 11 is threaded to receive a nut 35, which serves to retain the several washers and the spring in place. The spring 34 is preferably loosely disposed around the shaft 11, and by changing the thickness of the washers 31 and 32, or the relative position of the abutment washer 33, the spring may be adjusted to any desired tension, and other adjusting means may be provided as desired.

With the afore-described arrangement the shaft 11 is securely held in place and against displacement from the bearing 7 and rotational movements of the shaft relative to the bearing 7 are frictionally resisted or retarded through the co-operative action of the washers and packing rings 10, 28, and 29 with the spring 34 and abutment washer 33. Since the arm 16 is secured to the shaft 11, oscillatory or vibrational movements of the pulley 24 and consequently those of a belt or chain will be effectively reduced or minimized or practically inhibited.

While I have shown and described a preferred embodiment of my invention, it will be appreciated that it is of broader application, and I do not, therefore, desire to be limited except by the spirit of the invention and the scope of the attendant claims.

I claim:

1. An idler pulley mount comprising, a bearing having a recess at one end of the bore thereof, a shaft rotatably mounted in and extending through said bore and beyond the ends thereof, a second shaft, means securing said second shaft to one end of the first said shaft out of alignment therewith, a pulley rotatably mounted on the second shaft, means at the opposite end of the first said shaft for securing it against displacement, packing material in said recess and about the first said shaft, and resilient means normally compressing said material for imposing resistance to rotation of the first said shaft.

2. In a device of the character described a bearing having recessed ends, a shaft mounted in said bearing and having one end projecting beyond said recessed bearing end, an abutment on said projecting end of said shaft, a friction washer in said recess a crank arm connected to the other end of said shaft, a belt tightener pulley mounted on said crank arm and resilient means interposed between said abutment and washer for frictionally retarding relative movements of said shaft and bearing, said bearing having a recess at its opposite end and a friction washer disposed therein about said shaft.

In witness of the foregoing I affix my signature.

WARD S. IRELAND.